(12) United States Patent
Bruls (10) Patent No.: US 8,005,148 B2
(45) Date of Patent: Aug. 23, 2011

(54) VIDEO CODING

(75) Inventor: Wilhelmus Hendrikus Alfonsus Bruls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1788 days.

(21) Appl. No.: 10/543,434

(22) PCT Filed: Dec. 16, 2003

(86) PCT No.: PCT/IB03/06326
§ 371 (c)(1),
(2), (4) Date: Jul. 26, 2005

(87) PCT Pub. No.: WO2004/068861
PCT Pub. Date: Aug. 12, 2004

(65) Prior Publication Data
US 2006/0140269 A1    Jun. 29, 2006

(30) Foreign Application Priority Data

Jan. 30, 2003  (EP) ..................................... 03100188

(51) Int. Cl.
*H04N 7/18* (2006.01)
(52) U.S. Cl. ................................ 375/240.26; 375/240.1
(58) Field of Classification Search . 375/240.01–240.29
See application file for complete search history.

(56) References Cited

U.S. PATENT DOCUMENTS

| | | |
|---|---|---|
| 6,249,610 B1 | 6/2001 | Matsumoto et al. |
| 6,501,797 B1 | 12/2002 | Van Der Shaar et al. |
| 7,421,127 B2 * | 9/2008 | Bruls et al. ..................... 382/232 |
| 2003/0002579 A1 | 1/2003 | Radha et al. |

FOREIGN PATENT DOCUMENTS

| | | |
|---|---|---|
| WO | 9933274 A1 | 7/1999 |
| WO | 0103441 A1 | 1/2001 |
| WO | 0130085 A1 | 4/2001 |

* cited by examiner

*Primary Examiner* — Andy S Rao (57) ABSTRACT

A method and apparatus for encoding an input video bitstream to produce an encoded output bitstream is disclosed. A base stream is enhanced based on enhancement control parameters. At least one picture content parameter is extracted from the enhanced base stream. At least one picture content parameter is extracted from the input video bitstream. The enhanced picture content parameters are compared with the input picture content parameters. An output from the comparison step is received and the enhancement control parameters are calculated so as to minimize the difference between the input picture content parameters and the enhanced picture content parameters. The calculated control parameters are incorporated into the encoded output bitstream.

13 Claims, 6 Drawing Sheets

HF energy difference value

VIDEO CODING

FIELD OF THE INVENTION

The invention relates to video coding, and more particularly to spatial scalable video compression schemes.

BACKGROUND OF THE INVENTION

Because of the massive amounts of data inherent in digital video, the transmission of full-motion, high-definition digital video signals is a significant problem in the development of high-definition television. More particularly, each digital image frame is a still image formed from an array of pixels according to the display resolution of a particular system. As a result, the amounts of raw digital information included in high-resolution video sequences are massive. In order to reduce the amount of data that must be sent, compression schemes are used to compress the data. Various video compression standards or processes have been established, including, MPEG-2, MPEG-4, and H.264.

Many applications are enabled where video is available at various resolutions and/or qualities in one stream. Methods to accomplish this are loosely referred to as scalability techniques. There are three axes on which one can deploy scalability. The first is scalability on the time axis, often referred to as temporal scalability. Secondly, there is scalability on the quality axis, often referred to as signal-to-noise scalability or fine-grain scalability. The third axis is the resolution axis (number of pixels in image) often referred to as spatial scalability or layered coding. In layered coding, the bitstream is divided into two or more bitstreams, or layers. Each layer can be combined to form a single high quality signal. For example, the base layer may provide a lower quality video signal, while the enhancement layer provides additional information that can enhance the base layer image.

In particular, spatial scalability can provide compatibility between different video standards or decoder capabilities. With spatial scalability, the base layer video may have a lower resolution than the input video sequence, in which case the enhancement layer carries information which can restore the resolution of the base layer to the input sequence level.

Figure 1:
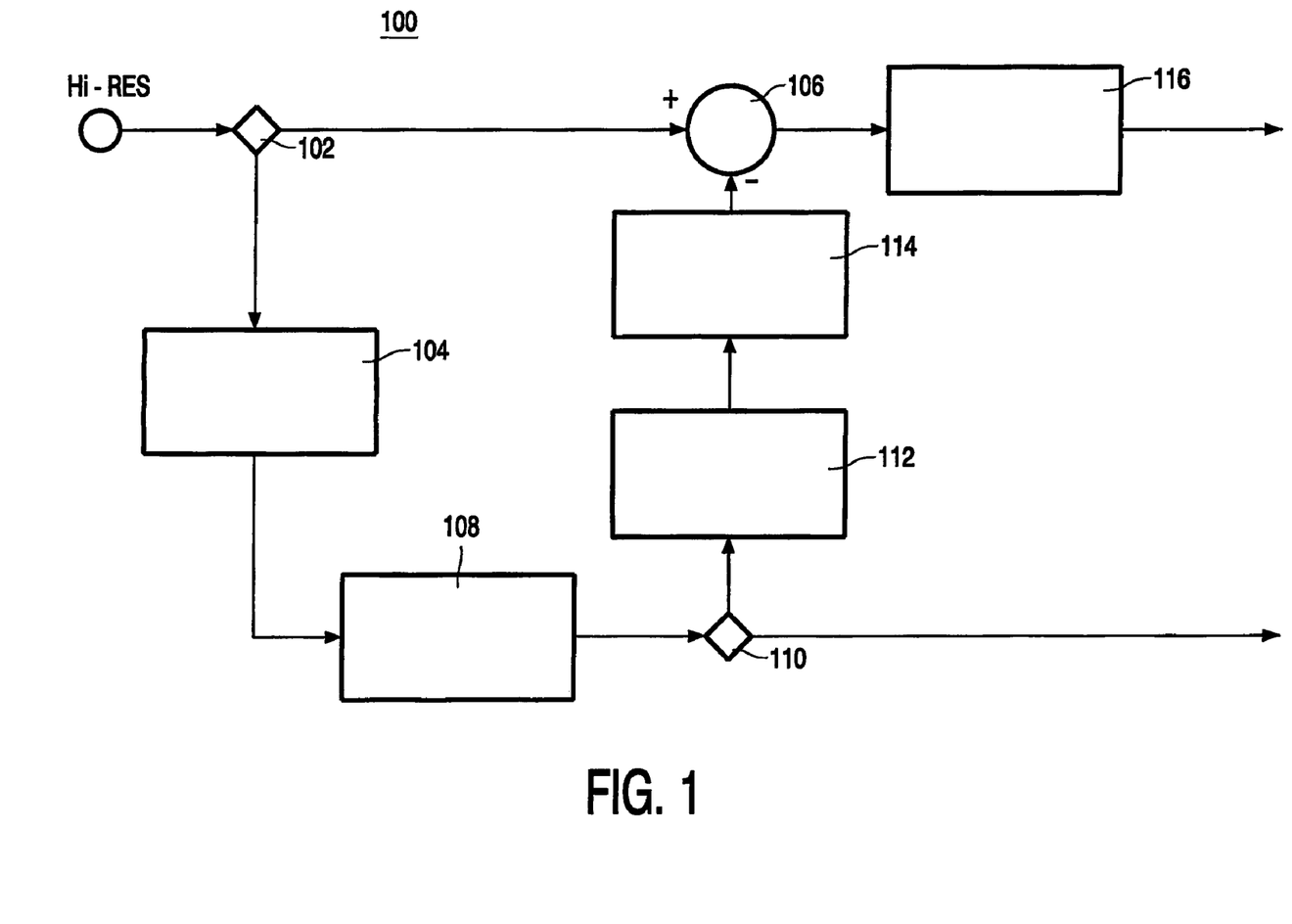
FIG. 1 is a block diagram representing a known layered video encoder.

FIG. 1 illustrates a known layered video encoder 100. The depicted encoding system 100 accomplishes layer compression, whereby a portion of the channel is used for providing a low resolution base layer and the remaining portion is used for transmitting edge enhancement information, whereby the two signals may be recombined to bring the system up to high-resolution. The high resolution video input Hi-RES is split by splitter 102 whereby the data is sent to a low pass filter 104 and a subtraction circuit 106. The low pass filter 104 reduces the resolution of the video data, which is then fed to a base encoder 108. In general, low pass filters and encoders are well known in the art and are not described in detail herein for purposes of simplicity. The encoder 108 produces a lower resolution base stream which is provided to a second splitter 110 from where it is output from the system 100. The base stream can be broadcast, received and via a decoder, displayed as is, although the base stream does not provide a resolution which would be considered as high-definition.

The other output of the splitter 110 is fed to a decoder 112 within the system 100. From there, the decoded signal is fed into an interpolate and upsample circuit 114. In general, the interpolate and upsample circuit 114 reconstructs the filtered out resolution from the decoded video stream and provides a video data stream having the same resolution as the high-resolution input. However, because of the filtering and the losses resulting from the encoding and decoding, certain errors are present in the reconstructed stream. These errors are determined in the subtraction circuit 106 by subtracting the reconstructed high-resolution stream from the original, unmodified high-resolution stream. The output of the subtraction circuit 106 is fed to an enhancement encoder 116 which outputs a reasonable quality enhancement stream.

The disadvantage of filtering and downscaling the input video to a lower resolution and then compressing it is that the video loses sharpness. This can to a certain degree be compensated for by using sharpness enhancement after the decoder. Picture enhancement techniques normally are controlled by analyzing the enhance output signal. If the original full resolution signal is used as a reference, the enhancement control can be improved. However, normally such a reference is not present for example in television sets. However, in some application, e.g., spatial scalable compression, such a reference signal is present. The problem, however, becomes how to make use of this reference. One possibility is to look to the pixel difference of the reference and the enhanced output signal. Control can be achieved by minimizing the difference energy. However, this method does not really take into account how the human eye perceives a picture as sharp. It is known that picture content parameters from a picture can be extracted which take into account how the human eye perceives a picture as sharp. Here the control algorithm tries to maximize these values, with the danger of overdoing it, resulting in sharp but not quite natural pictures. The problem is how to use these extracted picture content parameters when there is also a reference picture available to control picture enhancement.

SUMMARY OF THE INVENTION

The invention overcomes the deficiencies of other known layered compression schemes by using picture content parameters for both the enhanced output signal and the reference signal. A control algorithm controls the enhancement of the base stream in such a manner that the difference between the picture content parameters of the enhanced output signal and the reference signal becomes as low as possible. This prevents the enhancement from being overdone and results in sharp natural pictures.

According to one embodiment of the invention, a method and apparatus for encoding an input video bitstream to produce an encoded output bitstream is disclosed. A base stream is enhanced based on enhancement control parameters. At least one picture content parameter is extracted from the enhanced base stream. At least one picture content parameter is extracted from the input video bitstream. The enhanced picture content parameters are compared with the input picture content parameters. An output from the comparison step is received and the enhancement control parameters are calculated so as to minimize the difference between the input picture content parameters and the enhanced picture content parameters. The calculated control parameters are incorporated into the encoded output bitstream.

These and other aspects of the invention will be apparent from and elucidated with reference to the embodiments described hereafter.

BRIEF DESCRIPTION OF THE DRAWINGS

The invention will now be described, by way of example, with reference to the accompanying drawings, wherein.

DETAILED DESCRIPTION OF THE INVENTION

According to one embodiment of the invention, a spatial scalable compression scheme using spatial sharpness enhancement techniques is disclosed. In this embodiment of the invention, picture content information is extracted from both the reference signal and the enhanced output signal as will be described below.

Figure 2:
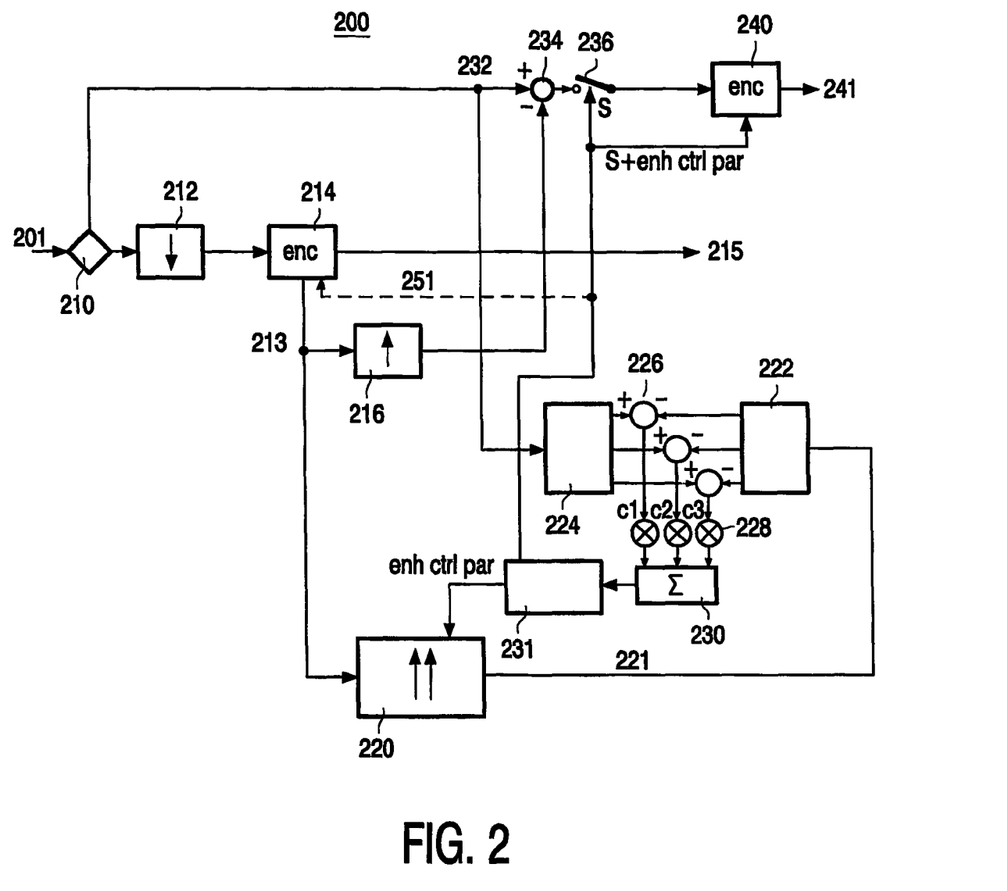
FIG. 2 is a block diagram of a layered video encoder/decoder according to one embodiment of the invention.

This embodiment will now be described in more detail with reference to FIG. 2 which is a block diagram of an encoder which can be used with the invention. It will be understood that the encoder can be a layered encoder with a base layer having a relatively low resolution and at least one enhancement layer, but the invention is not limited thereto. The depicted encoding system 200 accomplishes layer compression, whereby a portion of the channel is used for providing a low resolution base layer and the remaining portion is used for transmitting edge enhancement information, whereby the two signals may be recombined to bring the system up to high-resolution. The high resolution video input 201 is split by a splitter 210 whereby the data is sent to a low pass filter 212, for example a nyquist filter, and a splitter 232. The low pass filter 212 reduces the resolution of the video data, which is then fed to a base encoder 214. In general, low pass filters and encoders are well known in the art and are not described in detail herein for purposes of simplicity. The base encoder 214 produces a lower resolution base stream 215. The base stream can be broadcasted, received and via a decoder, displayed as is, although the base stream does not provide a resolution which would be considered as high-definition.

The encoder also outputs a decoded base stream to a splitter 213 which splits the decoded base stream and supplies it to an upscaling circuit 216 and an enhancement unit 220. In addition, a decoder (not illustrated) can be inserted into the circuit after the encoder 214 to decode the output of the encoder prior to being sent to the upscaling circuit 216. In general, the upscaling circuit 216 reconstructs the filtered out resolution from the decoded video stream and provides a video data stream having the same resolution as the high-resolution input. The upscaled bitstream v1 from the upscaling circuit 216 is inputted into a subtraction circuit 234.

The enhancement unit 220 processes the output signal 215 and enhances the signal according to the enhancement algorithm(s) in the enhancement unit 220 and enhancement control parameters ("enh ctrl par") produced by a control unit 231. Many video enhancement techniques exist and they all modify the picture content such that the appreciation of the resulting picture is improved. The subjective characteristic of these enhancements complicate the optimization process and is likely the reason for the diversity in video enhancement algorithms. Various enhancement algorithms contribute by some means to the picture quality. Noise reduction and sharpness improvement algorithms are just a few examples out of a large set of enhancement algorithms. It will be understood that any of these known enhancement algorithms can be used in the invention.

The enhanced output signal 221 is provided to a picture content parameter unit 222. The picture content parameter unit 222 extracts a plurality of picture content parameters from the enhanced output signal 221. In this illustrative example three picture content parameters are extracted from the enhanced output signal 221, but the invention is not limited thereto.

Figure 3A:
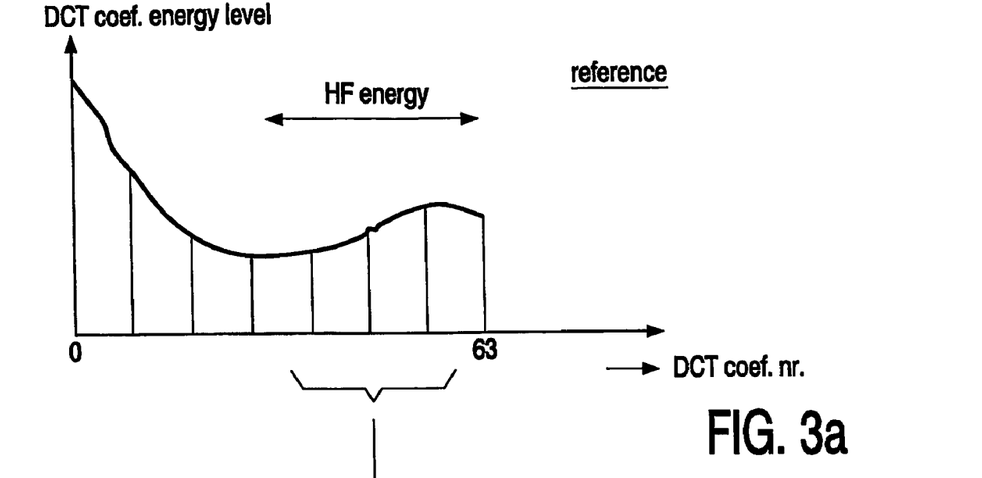
FIGS. 3a-3b illustrate DCT coefficient energy level curves according to one embodiment of the invention.
Figure 3B:
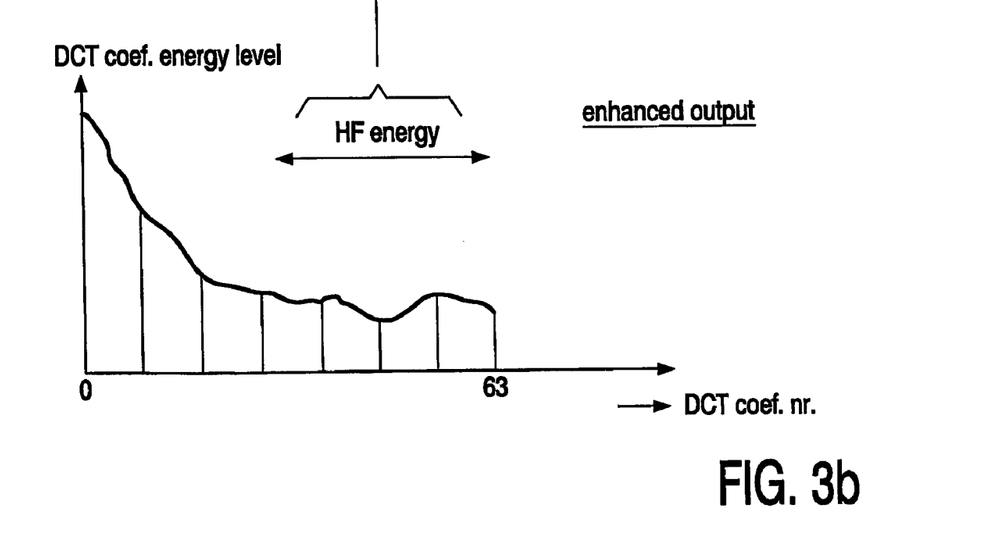

The reference signal 201 is provided to a picture content parameter unit 224. The picture content parameter unit 224 extracts the same plurality of picture content parameters from the reference signal 201 as the picture content parameter unit 222 extracts from the enhanced output signal 221. The picture content parameters can be globally frame based, but also be group of pixels based, e.g., 16*16 pixels. Examples of picture content parameters extracted from a picture or group of pixels comprises but is not limited thereto: difference between maximum and minimum value of a group of pixels; edge steepness value at center of edges, DCT coefficient High Frequency energy levels, etc. FIG. 3a illustrates a DCT coefficient energy level curve of the reference signal 201, and FIG. 3b illustrates a DCT coefficient energy level curve of the enhanced output signal 221.

The extracted picture content parameters from the reference picture content parameter unit 224 and the enhanced picture content parameter unit 222 are supplied to a comparison unit comprising, for example, at least one subtraction unit 226 and multiplication units 228. It will be understood by those skilled in the art that the comparison unit can be comprised of other elements as well. The subtraction units 226 subtract the enhanced picture content parameters from the reference picture content parameters. The output of each subtraction unit 226 can optionally be supplied to multiplication units 228 which multiples the outputs by predetermined factors (C1, C2, C3). The outputs of the multiplication unit are summed together in a summation unit 230 and supplied to the control unit 231. The control unit 231 processes the information received from the summation unit 230 and produces new enhancement control parameters. According to one embodiment of the invention, the control unit 231 controls the enhancement unit 220 via the enhancement control parameters so that the difference between the picture content parameters of the reference signal and the enhanced output signal becomes as low as possible. This also prevents the enhancement from being overdone which normally results in sharp but not quite natural pictures.

The upscaled output of the upscaling circuit 216 is subtracted from the original input 201 in a subtraction circuit 234 to produce a residual bitstream which is applied to a switch 236. The switch is controlled by the output (S) of the control unit 231. By comparing the input video bitstream 201 with the enhanced base video stream, the control unit 231 can determine which pixels or groups of pixels (blocks) need to be further enhanced by the enhancement layer 208. For the pixels or groups of pixels (blocks) that are determined to need enhancement by the control unit 231, the control unit 231 outputs the control signal (S) to close switch 236 to let those parts of the residual bitstream through to the enhancement layer encoder 240. The control unit 231 also sends the selected enhancement control parameters and the control signal for the switch 236 to the encoder 240 so that this information is incorporated (multiplexed) with the resulting residual bitstream in the enhancement stream 241.

Figure 4:
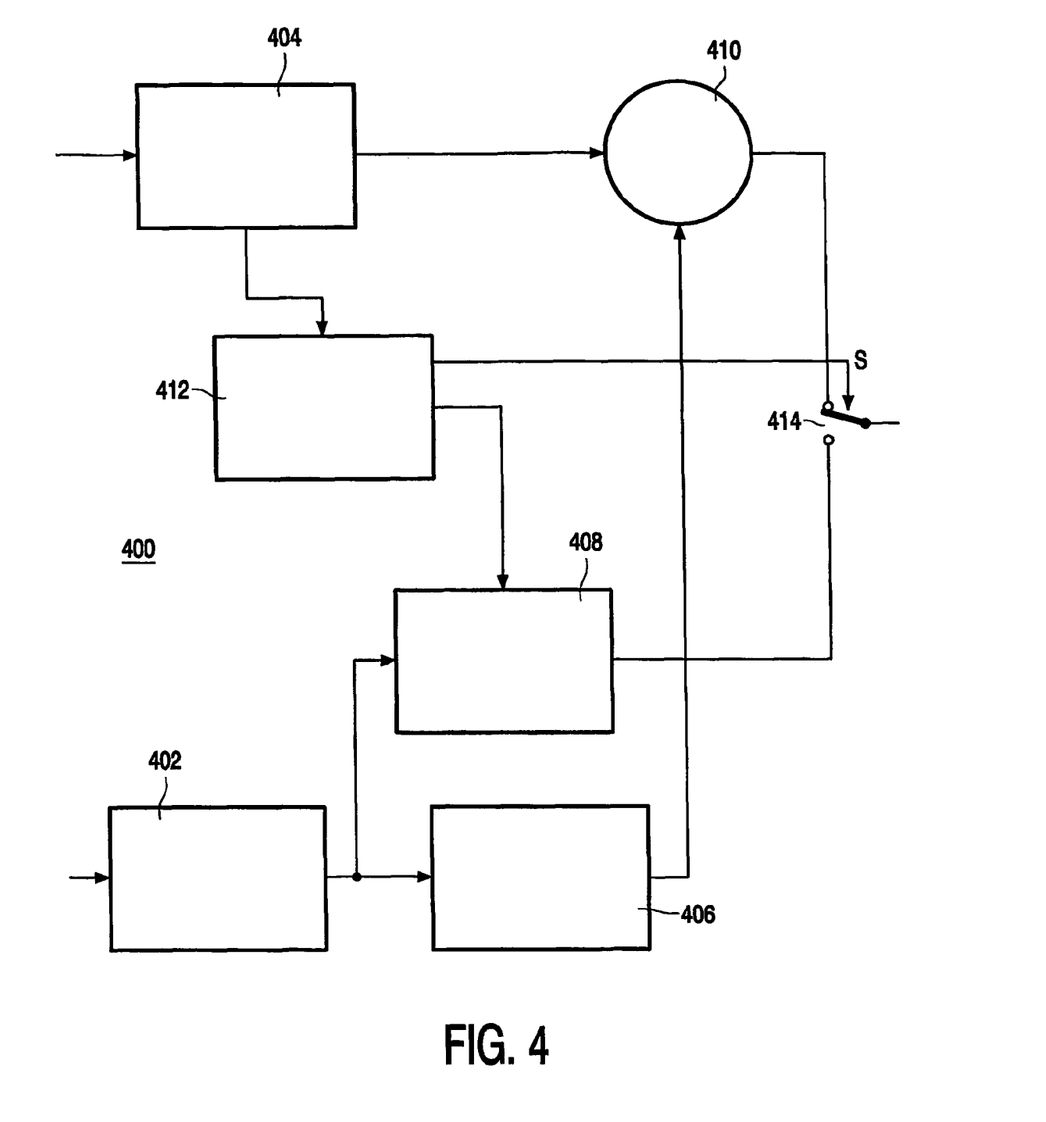
FIG. 4 is a block diagram of a decoder according to one embodiment of the invention.

FIG. 4 illustrates a decoder 400 which can be used to decode the base and enhancement streams from the encoder 200 according to one embodiment of the invention. In this embodiment, the base stream 215 is decoded by a base decoder 402 and the enhancement stream 241 is decoded by an enhancement decoder 404. The decoded base stream is supplied to an upconverter 406 and an enhancement unit 408. The decode enhancement stream is supplied to an addition unit 410. The addition unit 410 adds the decoded enhancement stream to the upconverted base stream from the upconverter 406 and provides the combined stream to one side of a switch 414.

The enhancement encoder also removes the signal S and the enhancement control parameters from the enhancement stream via a multiplexer (not illustrated) and provided the signal S and the enhancement control parameters to an enhancement control unit 412. The enhancement control unit 412 provides the signal S to the switch 414 and the enhancement control parameters to the enhancement unit 408. The enhancement unit 408 enhances the decoded base stream according to the enhancement algorithms in the enhancement unit 408 and the enhancement control parameters provided by the enhancement control unit 412. The enhanced base stream is then provided to the other side of the switch 414. Depending on the position of the switch as determined by the signal S, the decoder 400 outputs either the combined stream from the addition unit 410 or the enhanced base stream.

Figure 5:
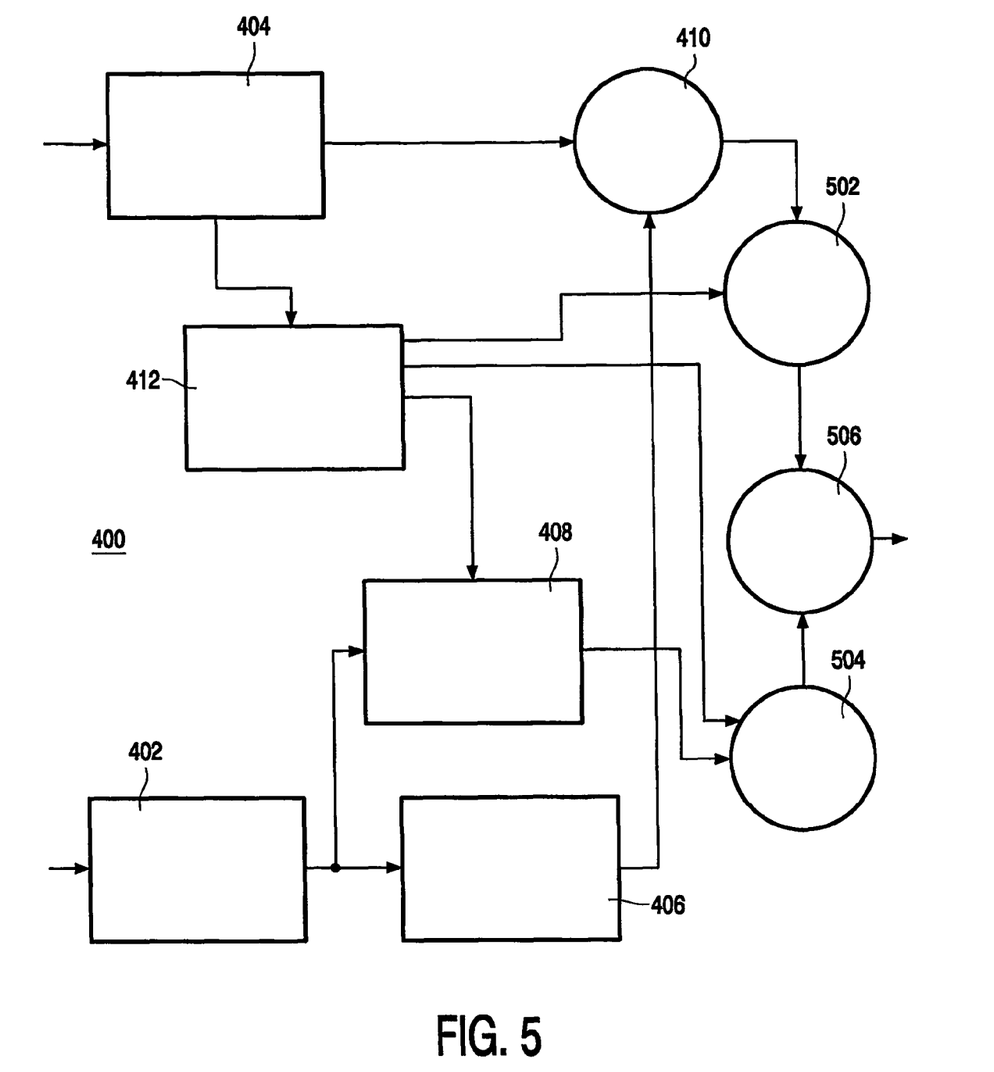
FIG. 5 is a block diagram of a decoder according to another embodiment of the invention.

According to another embodiment of the invention, the output of the decoder 400 may be a combination of the combined stream from the addition unit 410 and the enhanced base stream from the enhancement unit 408. As illustrated in FIG. 5, the signal s is provided to a pair of multiplication units 502 and 504, where S is a value between 0 and 1. In this illustrative example, the multiplication unit 502 multiples the combination stream from the addition unit 410 by the value of (1-S). The multiplication unit 504 multiplies the enhanced base stream by the value S. The outputs of the two multiplication units is combined in the addition unit 506 to form the output of the decoder.

In another embodiment of the invention, the output of the enhancement encoder section of the encoder 200 can be muted out by the control unit 231 or some other device. As a result, there is no enhancement stream outputted from the encoder 200. In this illustrative example, the enhancement control parameters are created as described above, but are provided to the base encoder 214 via the dashed line 251 in FIG. 2. The enhancement control parameters are then incorporated into the encoded base stream 215 via a multiplexer in the base encoder.

Figure 6:
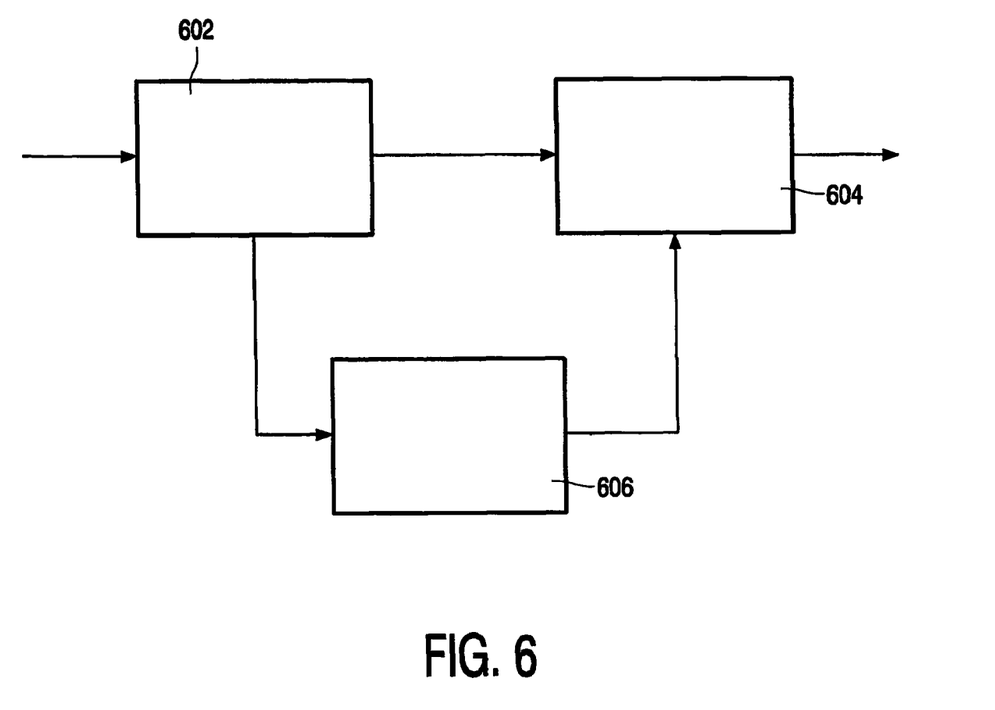
FIG. 6 is a block diagram of a decoder according to another embodiment of the invention.

The encoded base stream 215 with the incorporated enhancement control parameters can then be decoded by the decoder 600 illustrated in FIG. 6. The encoded base stream is decoded in the base decoder 602 and the decoded base stream is provided to an enhancement unit 604. The base decoder 602 also separates the enhancement control parameters from the encoded base stream 215 and supplies them to an enhancement control unit 606. The decoded base stream is then enhanced by the enhancement unit 604 according to the enhancement algorithms in the enhancement unit 604 and the enhancement control parameters from the enhancement control unit 606. The enhanced decoded base stream is then outputted from the decoder 600.

The above-described embodiments of the invention optimize picture sharpness or quality by using a control unit to control enhancement control parameters in such a manner so that the difference between picture content parameters from a reference signal and an enhanced signal become as low as possible.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. An encoder for encoding a high-resolution input video bitstream to produce an encoded output bitstream, comprising:
    an enhancement unit for enhancing (i) a lower-resolution decoded base stream (ii) based on enhancement control parameters;
    a first picture content parameter unit for extracting at least one picture content parameter from the enhanced lower-resolution decoded base stream;
    a second picture content parameter unit for extracting at least one picture content parameter from the input video bitstream;
    comparison means for comparing the enhanced lower-resolution decoded base stream picture content parameters with the input video bitstream picture content parameters;
    a control unit for receiving an output from the comparison means, and for calculating said enhancement control parameters which will minimize the difference between the input video bitstream picture content parameters and the enhanced lower-resolution decoded base stream picture content parameters; and
    means for incorporating the calculated enhancement control parameters into the encoded output bitstream.

2. The encoder as claimed in claim 1, wherein the encoder is a layered encoder with a base layer and at least one enhancement layer.

3. The encoder as claimed in claim 2, wherein the layered encoder is a spatial layered encoder where the base layer is of a relatively low resolution.

4. The encoder as claimed in claim 3, wherein said encoder further comprises:
    means for muting the input of the enhancement encoder when the difference between the input picture content parameters and the enhancement picture content parameters meet a predetermined criteria.

5. The encoder as claimed in claim 1, wherein the difference between selected picture content parameters is multiplied by a predetermined value prior to being inputted into the control unit.

6. The encoder as claimed in claim 5, wherein said encoder further comprises:
    a summation means for summing together the outputs of the comparison means which have been multiplied by the predetermined values.

7. The encoder as claimed in claim 1, wherein the picture content parameters are from the group comprising difference between maximum and minimum value of a group of pixels, edge steepness value at center of edges, DCT Coefficient High Frequency energy level curves.

8. An encoder for encoding a high-resolution input video bitstream, said encoder comprising:
    a downsampling unit for reducing the resolution of the high-resolution input video bitstream to produce a lower-resolution base stream;

a base encoder for encoding the lower-resolution base stream;

an upscaling unit for decoding and increasing the resolution of the base stream to produce an upscaled base bitstream;

an enhancement unit for enhancing (i) a lower-resolution decoded base stream (ii) based on enhancement control parameters;

a first picture content parameter unit for extracting at least one picture content parameter from the enhanced lower-resolution decoded base stream;

a second picture content parameter unit for extracting at least one picture content parameter from the input video bitstream;

a comparison means for comparing the enhanced lower-resolution decoded base stream picture content parameters from the input video bitstream picture content parameters;

a control unit for receiving an output from the comparison means and for calculating said enhancement control parameters which will minimize the difference between the input video bitstream picture content parameters and the enhanced lower-resolution decoded base stream picture content parameters;

a subtraction unit for subtracting the upscaled base bitstream from the input video bitstream to produce a residual bitstream;

switching means for selectively allowing only portions of the residual bitstream to be sent to an enhancement encoder based upon a control signal from the control unit; and an enhancement encoder for incorporating the portions of the residual bitstream which pass through the switching means with said enhancement control parameters to form the encoded residual bitstream.

9. The encoder as claimed in claim 8, wherein said switching means is a multiplier having a value of either "0" or "1", wherein a value of "0" means the switching means is open and a value of "1" means the switching means is closed.

10. The encoder as claimed in claim 8, wherein the comparison between selected picture content parameters is multiplied by a predetermined value prior to being inputted into the control unit.

11. The encoder as claimed in claim 10, wherein said encoder further comprises:

a summation means for summing together the outputs of the comparison means which have been multiplied by the predetermined values.

12. The encoder as claimed in claim 8, wherein the picture content parameters are from the group comprising difference between maximum and minimum value of a group of pixels, edge steepness value at center of edges, DCT Coefficient High Frequency energy level curves.

13. A method for encoding a high-resolution input video bitstream in an encoder to produce an encoded output stream, said method comprising the steps of:

enhancing, via an enhancement unit, (i) a lower-resolution decoded base stream (ii) based on enhancement control parameters;

extracting, via a first picture content parameter unit, at least one picture content parameter from the enhanced lower-resolution decoded base stream;

extracting, via a second picture content parameter unit, at least one picture content parameter from the input video bitstream;

comparing, via a comparison means, the enhanced lower-resolution decoded base stream picture content parameters from the input video bitstream picture content parameters;

receiving, via a control unit, an output from the comparison step and calculating, via the control unit, said enhancement control parameters which will minimize the difference between the input video bitstream picture content parameters and the enhanced lower-resolution decoded base stream picture content parameters; and incorporating, via one of a base encoder or an enhancement layer encoder, the calculated enhancement control parameters into the encoded output bitstream.

\* \* \* \* \*